United States Patent
Katayama et al.

(10) Patent No.: US 11,743,373 B2
(45) Date of Patent: Aug. 29, 2023

(54) DRIVING SUPPORT DEVICE

(71) Applicant: HONDA MOTOR CO., LTD., Tokyo (JP)

(72) Inventors: Makoto Katayama, Saitama (JP); Osamu Ito, Saitama (JP); Hideo Kadowaki, Tokyo (JP); Hiroki Tanaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/575,648

(22) Filed: Jan. 14, 2022

(65) Prior Publication Data
US 2022/0247856 A1 Aug. 4, 2022

(30) Foreign Application Priority Data
Feb. 4, 2021 (JP) .................................. 2021-016526

(51) Int. Cl.
H04M 1/72421 (2021.01)
G08G 1/16 (2006.01)
H04M 3/51 (2006.01)

(52) U.S. Cl.
CPC ........ *H04M 1/72421* (2021.01); *G08G 1/164* (2013.01); *H04M 3/5116* (2013.01)

(58) Field of Classification Search
CPC . H04M 1/72421; H04M 3/5116; G08G 1/164
(Continued)

(56) References Cited

U.S. PATENT DOCUMENTS 10,124,757 B1\* 11/2018 Kerr ......................... B60Q 7/00
2010/0202368 A1\* 8/2010 Hans ....................... H04W 4/90
370/352
(Continued)

FOREIGN PATENT DOCUMENTS

JP 2005041334 A 2/2005
JP 2007048302 A 2/2007
(Continued)

OTHER PUBLICATIONS

Notification of Reasons for Refusal issued in the JP Patent Application No. 2021-016526, dated Mar. 28, 2023.

*Primary Examiner* — Maria El-Zoobi
(74) *Attorney, Agent, or Firm* — CKC & Partners Co., LLC (57) ABSTRACT

The present disclosure provides a driving support device which can reduce injury during collision. A driving support device 11 includes: a peripheral information acquisition unit 40 which acquires peripheral information of a vehicle 1; a moving body detection unit 201 which detects a two-wheel vehicle 100 in the periphery of the vehicle 1 based on the peripheral information; an overturn determination unit 202 which determines whether the two-wheel vehicle 100 has overturned based on the peripheral information; an additional information acquisition unit 203 which acquires the additional information indicating the overturn situation of the two-wheel vehicle 100, in the case of being determined that the two-wheel vehicle 100 overturned; and an emergency information sending unit 204 which sends the additional information to the emergency call center 200 together with the emergency call information for performing an emergency call for the two-wheel vehicle 100.

4 Claims, 4 Drawing Sheets

(58) Field of Classification Search
USPC ........................................................ 455/404.1
See application file for complete search history.

(56) References Cited

U.S. PATENT DOCUMENTS

| | | | | |
|---|---|---|---|---|
| 2012/0271484 | A1* | 10/2012 | Feit | B60W 40/04 |
| | | | | 701/1 |
| 2014/0375446 | A1 | 12/2014 | Wanami et al. | |
| 2015/0257646 | A1* | 9/2015 | Groeschke | A61B 5/18 |
| | | | | 340/870.07 |
| 2017/0217429 | A1* | 8/2017 | Shioe | B60W 30/08 |

FOREIGN PATENT DOCUMENTS

| | | | |
|---|---|---|---|
| JP | 2010244167 | A | 10/2010 |
| JP | 2015005075 | A | 1/2015 |
| JP | 2015230579 | A | 12/2015 |
| JP | 2017132390 | A | 8/2017 |
| JP | 2020071505 | A | 5/2020 |
| JP | 2020149622 | A | 9/2020 |
| JP | 2020152236 | A | 9/2020 |
| JP | 2020161009 | A | 10/2020 |
| WO | 2017179182 | A1 | 10/2017 |

* cited by examiner

DRIVING SUPPORT DEVICE

This application is based on and claims the benefit of priority from Japanese Patent Application No. 2021-016526, filed on 4 Feb. 2021, the content of which is incorporated herein by reference.

BACKGROUND OF THE INVENTION

Field of the Invention

The present invention relates to a driving support device.

Related Art

Conventionally, technology for emergency notifying of an event occurrence such as accident occurrence has been known (for example, refer to Patent Document 1). Patent Document 1 discloses analyzing an accident situation from images captured by a rear camera when an unusual event arises in acceleration, notifying of accident occurrence to a contact address during an emergency, and sending image information.

Patent Document 1: Japanese Unexamined Patent Application, Publication No. 2020-152236

SUMMARY OF THE INVENTION

A two-wheel vehicle is difficult to equip with a communication device from the viewpoint of cost and mountability. In addition, it will take time until the mounting of the communication device to the two-wheel vehicle spreads widely. In the case of a collision accident between four-wheel vehicles, for the four-wheel vehicle on the collided side, the injury to the passenger is slight if the airbag is activated appropriately. Furthermore, the four-wheel vehicle often mounts a communication device for performing an emergency call.

On the other hand, there are many cases where two-wheel vehicles are not mounted with an airbag and communication device, and further, there is a possibility of a two-wheel vehicle overturning during a collision. For this reason, in the case of the two-wheel vehicle colliding with a four-wheel vehicle, there is a possibility of the injury to the passenger of the two-wheel vehicle being great.

Therefore, the present invention has an object of providing a driving support device which can reduce injury during a collision.

A driving support device (for example, the driving support device 11 described later) according to the present invention includes: a peripheral information acquisition unit (for example, the peripheral information acquisition unit 40 described later) which acquires peripheral information of a vehicle (for example, the vehicle 1 described later); a moving body detection unit (for example, the moving body detection unit 201 described later) which detects a moving body (for example, the two-wheel vehicle 100 described later) in a periphery of the vehicle based on the peripheral information; an overturn determination unit (for example, the overturn determination unit 202 described later) which determines whether the moving body overturned based on the peripheral information; an additional information acquisition unit (for example, the additional information acquisition unit 203 described later) which acquires additional information indicating an overturn situation of the moving body, in a case of being determined that the moving body overturned; and an emergency information sending unit (for example, the emergency information sending unit 204 described later) which sends the additional information to an external device together with emergency call information for performing an emergency call for the moving body.

In addition, the driving support device further includes: an additional information determination unit (for example, the additional information determination unit 205 described later) which determines whether to send the additional information according to an overturn situation of the moving body, in which the emergency information sending unit sends the additional information to the external device together with the emergency call information, in a case of being determined to send the additional information by the additional information determination unit.

Moreover, the driving support device further includes: a stop request unit (for example, the stop request unit 206 described later) which requests for stopping to the driver of the vehicle, in a case of being determined that the moving body overturned, in which the emergency information sending unit sends automatic transmittable information which was set in advance to the external device together with the emergency call information, in a case of the vehicle not stopping.

Furthermore, the emergency information sending unit sends the additional information to the external device together with the emergency call information, in a case of the vehicle stopping.

Additionally, the driving support device further includes: an urgent aid treatment method display unit (for example, the urgent aid treatment method display unit 207 described later) which displays information of urgent aid according to an instruction of an emergency call center, in which the urgent aid treatment method display unit, after an operator of the emergency call center confirms the additional information, displays a method of appropriate urgent aid treatment selected by the operator to the driver.

According to the present invention, it is possible to provide a driving support device which can reduce injury during collision.

DETAILED DESCRIPTION OF THE INVENTION

Figure 1:
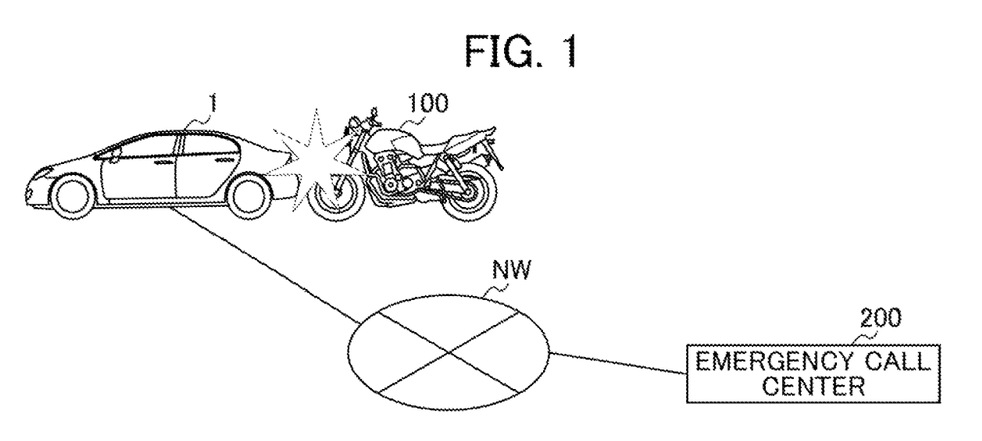
FIG. 1 is a view showing an example of a situation where a vehicle according to the present embodiment and a two-wheel vehicle collided.

Hereinafter, an embodiment of a driving support device of the present invention will be explained by referencing the drawings. FIG. 1 is a view showing an example of a situation where a vehicle 1 according to the present embodiment and a two-wheel vehicle 100 have collided. As shown in FIG. 1, the vehicle 1 collides with the two-wheel vehicle (moving body) 100 during travel. The vehicle 1 can communicate with an emergency call center 200 via a network NW.

When the vehicle 1 collides with the two-wheel vehicle 100 during travel, there is a high probability of the two-wheel vehicle 100 overturning, and injury occurring to the passenger of the two-wheel vehicle 100. For this reason, the vehicle 1 performs an emergency call to an emergency call center 200 via the network NW, and requests for aid, etc. of the passenger of the two-wheel vehicle 100. In this way, the driving support device of the vehicle 1 according to the present embodiment has an object of performing emergency call upon colliding with the two-wheel vehicle 100, and reducing the injury during collision.

It should be noted that, in the present embodiment, although a case of the two-wheel vehicle 100 as a moving body colliding with the vehicle 1 is explained below, the driving support device of the vehicle 1 according to the present embodiment is not limited to a collision between the vehicle 1 and the two-wheel vehicle 100, and can also be applied to a case of the vehicle 1 and a bicycle, pedestrian or the like colliding, for example.

Figure 2:
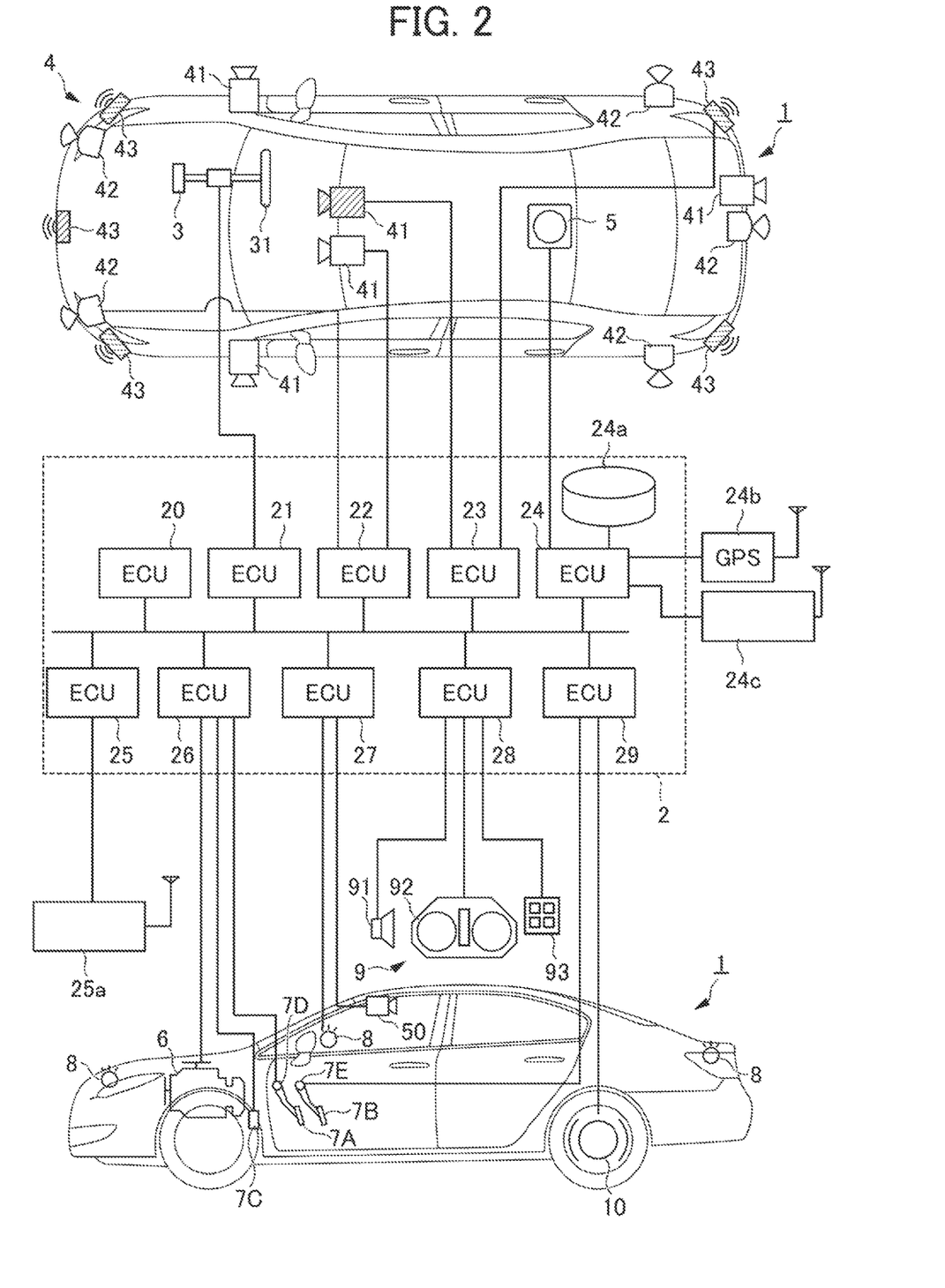
FIG. 2 is a block diagram showing the configuration of a vehicle according to the present embodiment.

FIG. 2 is a block diagram showing the configuration of a vehicle 1 according to the present embodiment. FIG. 2 shows an outline of the vehicle 1 combining a plan view and a side view. The vehicle 1 is a four-wheeled passenger car of sedan type as one example.

The vehicle 1 includes a control device 2. The control device 2 includes a plurality of ECUs (automatic driving ECU 20 to stop control ECU 29) connected to enable transmitting by way of an onboard network. Each ECU functions as a computer including a processor of which a CPU is representative, a storage device such as semiconductor memory, an interface such as an external device, etc. The storage device stores the program executed by a processor, and data used in processing by the processor, etc. Each ECU may include a plurality of processors, storage devices, interfaces, etc.

Hereinafter, the function of each automatic operation ECU 20 to stop control ECU 29, etc. will be explained. It should be noted that the number of ECUs and corresponding functions can be set appropriately, and can be subdivided or integrated more than the ECUs shown in the present embodiment.

The automatic operation ECU 20 executes control for automatic operation of the vehicle 1. In automatic operation, at least one of steering of the vehicle 1, or acceleration and deceleration is automatically controlled.

A steering ECU 21 controls an electric power steering device 3. The electric power steering device 3 includes a mechanism which steers front wheels in response to a driving operation (steering operation) of the driver on a steering wheel 31. In addition, the electric power steering device 3 includes a motor which exerts a driving force for assisting a steering operation or automatically steering the front wheels; a sensor detecting the steering angle; etc. In the case of the driving state of the vehicle 1 being automatic operation, the steering ECU 21 automatically controls the electric power steering device 3 in response to the instruction from the automatic operation ECU 20, and controls the travel direction of the vehicle 1.

Travel support ECUs 22 and 23 perform control of a camera 41, LIDAR 42 and millimetric wave radar 43, which detect the ambient conditions of the vehicle, and information processing of detection results. The camera 41 images the front, sides and rear of the vehicle 1. In the case of the present embodiment, two of the cameras 41 are provided at the front of the vehicle 1, and one is provided to each side and the rear. The travel support ECUs 22 and 23 can extract an outline of a target, and extract dividing lines of lanes on a road (white lines, etc.), by analysis of the images captured by the camera 41.

The LIDAR 42 is Light Detection and Ranging (LIDAR), detects landmarks of the surroundings of the vehicle 1, and measures the distance from landmarks. In the case of the present embodiment, five LIDAR 42 are provided, one being provided to each corner at the front of the vehicle 1, one at the center in the rear, and one at each side in the rear.

The millimetric wave radar 43 detects landmarks of the surroundings of the vehicle 1, and measures the distance from the landmarks. In the case of the present embodiment, five millimetric wave radar 43 are provided, one being provided at the center in the front of the vehicle 1, one at each corner in the front, and one provided at each corner in the rear.

The travel support ECU 22 performs control of one camera 41 in the front of the vehicle 1 and each LIDAR 42, and information processing of detection results. The travel support ECU 23 performs control of another camera 41 in the front of the vehicle 1 and each millimetric wave radar 43, and information processing of detection results. It is possible to improve the reliability of detection results by equipping two groups of ECUs detecting the ambient conditions of the vehicle 1, and it is possible to perform multi-faceted analysis of the surrounding environment of the vehicle 1, by equipping detection units of different types such as the camera 41, LIDAR 42 and millimetric wave radar 43.

A position recognition ECU 24 performs controls of a gyro sensor 5, GPS sensor 24b and communication device 24c, and performs information processing of detection results or communication results. The gyro sensor 5 detects gyration of the vehicle 1. The position recognition ECU 24 can determine the route of the vehicle 1, according to the detection results of the gyro sensor 5, wheel speed, etc.

The GPS sensor 24b detects the current position of the vehicle 1. The communication device 24c performs wireless communication with a server that provides map information, traffic information, etc. In addition, the communication device 24c performs wireless communication with an external server, and can send vehicle information, positional information, sensor information, etc. of the vehicle 1 to the external server. The position recognition ECU 24 can access a database 24a of map information constructed in the storage device, and the position recognition ECU 24 performs route guidance from a current location to a destination, etc.

The communication control ECU 25 includes a communication device 25a for inter-vehicle communication. The communication device 25a performs wireless communication with other vehicles in the surroundings, and performs information exchange between vehicles.

The drive control ECU 26 controls a power plant 6. The power plant 6 is a mechanism which outputs driving force causing the drive wheels of the vehicle 1 to rotate, and includes an engine and transmission, for example. The drive control ECU 26, for example, controls the output of the engine in response to driving operation (acceleration operation or acceleration operation) of the driver detected by an operation detection sensor 7D provided to the accelerator pedal 7A. Then, the drive control ECU 26 switches the variable speed level of the transmission based on information of the vehicle speed, etc. detected by the vehicle speed sensor 7C. In the case of the driving state of the vehicle 1 being automatic driving, the drive control ECU 26 automatically controls the power plant 6 in response to the instruction from the automatic driving ECU 20, and controls acceleration/deceleration of the vehicle 1.

A vehicle external notification control ECU 27 controls a lighting unit (headlights, taillights, etc.) including directional indicators 8 (winkers). In the case of the example of FIG. 1, the directional indicators 8 are provided at the front, door mirrors, and rear of the vehicle 1.

A vehicle internal notification control ECU 28 performs control of an input/output device 9. The input/output device 9 performs output of information to the driver, and reception of inputs of information from the driver. The input/output device 9 has a voice output device 91, display device 92 and input device 93.

The voice output device 91 notifies information by voice to the driver. The display device 92 notifies information by the display of images to the driver. The display device 92 is arranged in front of the driver's seat, and configures an instrument panel, etc. The input/output device 9 is exemplified by the output of voice and display of images; however, it may notify of information by vibration or light.

In addition, the input/output device 9 may notify information by combining a plurality of voice, display, vibration or light. Furthermore, the input/output device 9 may differentiate the combinations according to the level of information to notify (for example, urgency), and differentiate the notification mode.

The input device 93 is arranged at a position allowing operation by the driver, and is a switch group for performing instruction to the vehicle 1; however, it may include a voice input device.

The stop control ECU 29 controls the brake device 10 and parking brake (not shown). The brake device 10 is a disc brake device, for example, is provided to each wheel of the vehicle 1, and causes the vehicle 1 to decelerate or stop by applying resistance to rotation of the wheels.

The stop control ECU 29, for example, controls operation of the brake device 10 in response to a driving operation (brake operation) of the driver detected by an operation detection sensor 7E provided to the brake pedal 7B. In the case of the driving state of the vehicle 1 being automatic driving, the stop control ECU 29 automatically controls the brake device 10 in response to instruction from the ECU 20, and controls deceleration and stopping of the vehicle 1. The brake device 10 and parking brake can operate in order to maintain the stopped state of the vehicle 1. In addition, in the case of the transmission of the power plant 6 including a parking lock mechanism, this parking lock mechanism can operate in order to maintain the stopped state of the vehicle 1.

The vehicle 1 further includes a vehicle interior detection sensor 50 for detecting the state of the vehicle interior. Herein, the vehicle interior detection sensor 50 is configured from a camera as an imaging unit, a weight sensor, temperature detection sensor, etc., and the types thereof are not particularly limited. It should be noted that the vehicle interior detection sensor 50 may be provided to every seat provided in the vehicle 1, or may be provided in a single configuration such that can overlook and monitor the entire vehicle interior.

Figure 3:
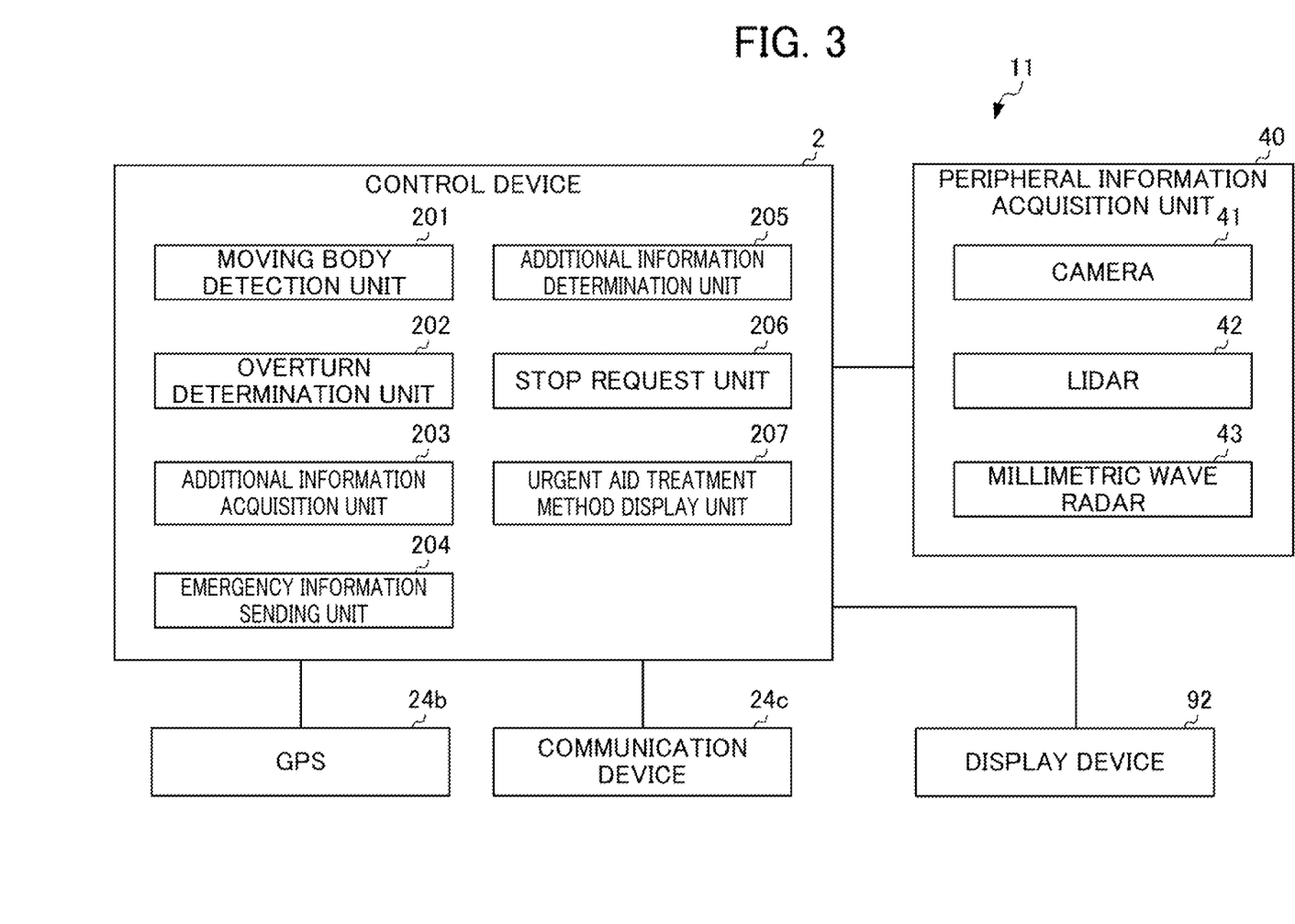
FIG. 3 is a view showing the functional configuration of a driving support device according to the present embodiment.

Hereinafter, processing of the driving support device 11 according to the present embodiment will be explained. FIG. 3 is a view showing the functional configuration of the driving support device 11 according to the present embodiment. As shown in FIG. 3, the driving support device 11 is realized by the constituent elements of the aforementioned vehicle 1. In other words, the driving support device 11 includes the control device 2, GPS sensor 24b, communication device 24c and peripheral information acquisition unit 40.

The control device 2 includes a moving body detection unit 201, overturn determination unit 202, additional information acquisition unit 203, emergency information sending unit 204, additional information determination unit 205, stop request unit 206, and urgent aid treatment method display unit 207. The peripheral information acquisition unit 40 includes the aforementioned camera 41, LIDAR 42 and millimetric wave radar 43.

The peripheral information acquisition unit 40 acquires peripheral information of the periphery of the vehicle 1. For example, the peripheral information acquisition unit 40 acquires peripheral information behind or ahead of the vehicle 1 for which it is difficult for the driver to see. The peripheral information, for example, is images of the periphery of the vehicle 1 acquired by the camera 41. In addition, the peripheral information may be data of the periphery of the vehicle 1 acquired by the LIDAR 42 or millimetric wave radar 43, for example.

The moving body detection unit 201 detects a moving body in the periphery of the vehicle 1 based on the peripheral information acquired by the peripheral information acquisition unit 40. More specifically, the moving body detection unit 201 detects the two-wheel vehicle 100 behind or ahead of the vehicle 1, based on peripheral information acquired by the peripheral information acquisition unit 40.

For example, the moving body detection unit 201 may detect the two-wheel vehicle 100 by the data outputted from the LIDAR 42 or millimetric wave radar 43, and the camera 41 may acquire captured images including the two-wheel vehicle 100. In addition, the moving body detection unit 201 may analyze the captured images acquired by the camera 41 using pattern matching, etc., and detect the two-wheel vehicle 100. In addition, the moving body detection unit 201 may detect the two-wheel vehicle 100 using data outputted from an acceleration sensor for airbag, in the case of the two-wheel vehicle 100 contacting the vehicle 1.

The overturn determination unit 202 determines whether the two-wheel vehicle 100 has overturned, based on the peripheral information acquired by the peripheral information acquisition unit 40. More specifically, the overturn determination unit 202 analyzes captured images acquired by the camera 41 using pattern matching, etc., and determines whether the two-wheel vehicle 100 has overturned.

In addition, the overturn determination unit 202 may determine whether the two-wheel vehicle 100 has contacted the vehicle 1, based on the peripheral information acquired by the peripheral information acquisition unit 40, prior to determining overturn of the two-wheel vehicle 100. In this case, the overturn determination unit 202 analyzes the captured images acquired by the camera 41 using pattern matching, etc., and determines whether the two-wheel vehicle 100 has contacted the vehicle 1.

The additional information acquisition unit 203 acquires additional information indicating an overturn situation of the two-wheel vehicle 100, in the case of being determined that the two-wheel vehicle 100 overturned. Herein, the additional information, for example, is captured images including part or the entirety of the overturned two-wheel vehicle 100, and is acquired by the camera 41 arranged at the front or rear of the vehicle 1. In addition, the additional information may include other information such as captured images acquired by the camera 41 arranged at the front of the vehicle 1, or data outputted from the LIDAR 42 and/or millimetric wave radar 43.

The emergency information sending unit 204 sends to the emergency call center 200 via the network NW the additional information together with emergency call information for performing an emergency call for the overturned two-wheel vehicle 100 by way of the communication device 24c.

Herein, the emergency call information includes positional information, vehicle information, sensor information, etc. of the vehicle 1 acquired by the vehicle 1. The emergency call center 200, when receiving emergency call information from the vehicle 1, sends the emergency call information to a police station, fire station, road service, or the like. The police station, fire station, road service, or the like can thereby perform rescue and support of the vehicle 1 having sent the emergency call information.

The additional information determination unit 205 determines whether or not to send additional information acquired by the additional information acquisition unit 203 to the emergency call center 200, in response to the overturn situation of the overturned two-wheel vehicle 100. The additional information determination unit 205, for example, may determine whether or not to send additional information to the emergency call center 200, according to whether or not the driver of the vehicle 1 approves sending additional information to the emergency call center 200, by an operation of the input device 93.

Herein, the driver of the vehicle 1, for example, approves sending the additional information to the emergency call center 200 by operation of the input device 93, in the case of the injury to the passenger of the overturned two-wheel vehicle 100 being great. In addition, in the case of the injury to the passenger of the overturned two-wheel vehicle 100 being slight, the driver of the vehicle 1 does not approve sending additional information to the emergency call center 200 by operation of the input device 93.

In addition, the additional information determination unit 205 may determine whether to send additional information to the emergency call center 200, by determining the overturn situation of the two-wheel vehicle 100 using pattern matching, based on images indicating the overturn situation of the two-wheel vehicle 100 in the additional information, for example.

For example, the additional information determination unit 205 determines the overturn situation of the two-wheel vehicle 100, based on images showing the overturn situation of the two-wheel vehicle 100 in the additional information. Then, the additional information determination unit 205 determines to send the additional information to the emergency call center 200, in the case of having determined that the injury to the passenger of the overturned two-wheel vehicle 100 is great. In addition, the additional information determination unit 205 determines not to send the additional information to the emergency call center 200, in the case of having determined that the injury to the passenger of the overturned two-wheel vehicle 100 is slight.

Then, the emergency information sending unit 204 sends the additional information together with emergency call information to the emergency call center 200 by way of the communication device 24c, in the case of having determined to send the additional information by way of the additional information determination unit 205.

The stop request unit 206 requests stopping to the driver of the vehicle 1, in the case of being determined that the two-wheel vehicle 100 overturned by way of the overturn determination unit 202. For example, the stop request unit 206 requests stopping to the driver of the vehicle 1, by displaying characters or images by the display device 92, or notifying by voice by the voice output device 91.

Then, the emergency information sending unit 204 sends automatic transmittable information which was set in advance to the emergency call center 200 together with the emergency call information, in the case of the vehicle 1 not stopping after the request by the stop request unit 206.

Herein, the automatic transmittable information is information set in advance by the driver of the vehicle 1, etc., and includes positional information of the vehicle 1 acquired by the GPS sensor 24b, for example.

In addition, the emergency information sending unit 204 sends the additional information to the emergency call center 200 together with the emergency call information, in the case of the vehicle 1 stopping after the request by the stop request unit 206.

The urgent aid treatment method display unit 207 displays information of urgent aid on the display device 92 in response to an instruction of the emergency call center 200. For example, the urgent aid treatment method display unit 207 displays a method of the appropriate emergency aid treatment selected by an operator on the display device 92 visible by the driver of the vehicle 1, after the operator of the emergency call center 200 confirms the additional information.

The method of the urgent aid treatment displayed, for example, is a method for aiding the passenger of the overturned two-wheel vehicle 100, and may be a display of instructions to stop a bleeding location, a cardiopulmonary resuscitation method, approximate installation site of AED (Automated External Defibrillator), etc.

Figure 4:
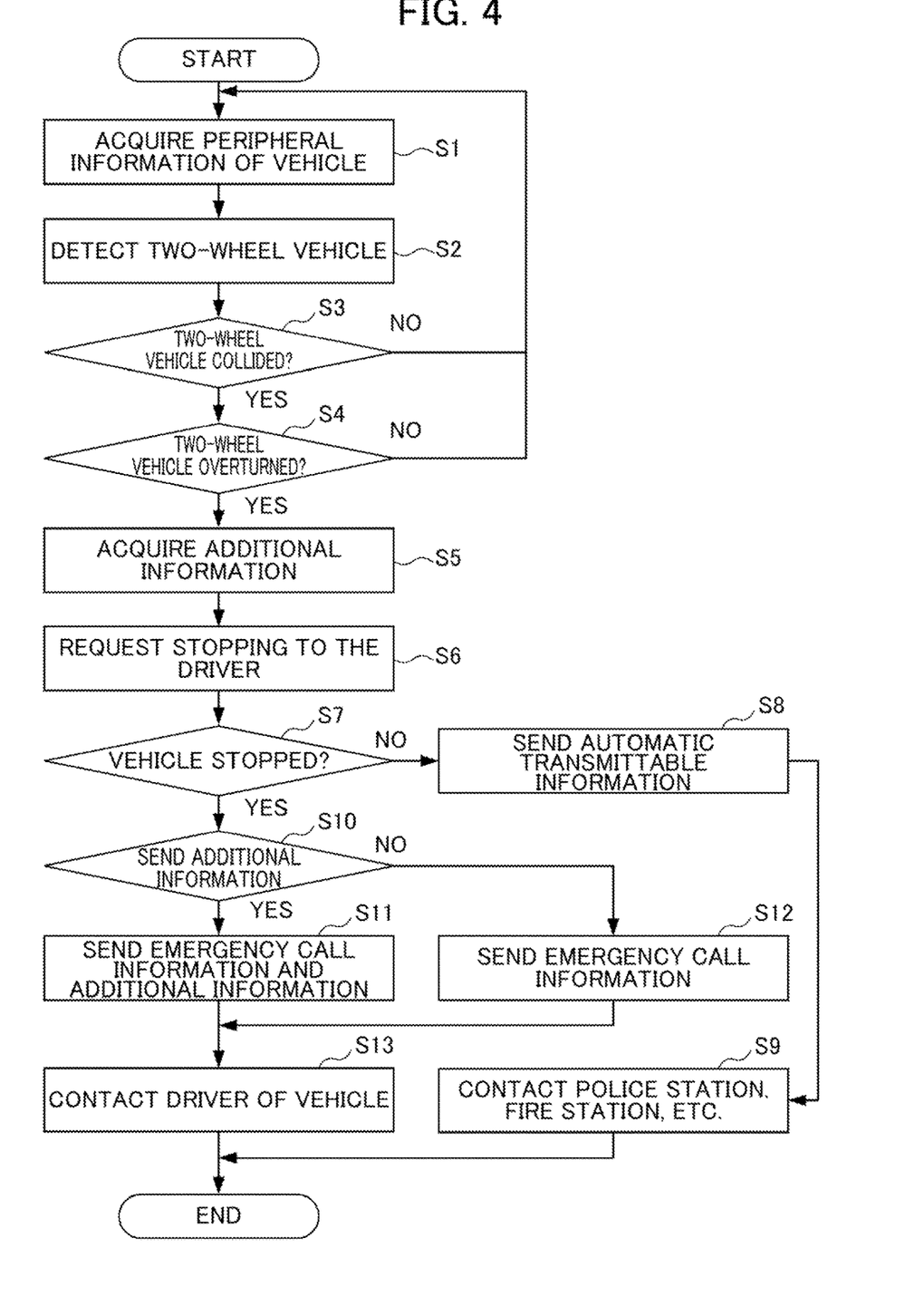
FIG. 4 is a flowchart showing processing of the driving support device according to the present embodiment.

FIG. 4 is a flowchart showing the processing of the driving support device 11 according to the present embodiment. In Step S1, the peripheral information acquisition unit 40 acquires peripheral information of the vehicle 1. In Step S2, the moving body detection unit 201 detects the two-wheel vehicle 100 behind or ahead of the vehicle 1 based on the peripheral information acquired by the peripheral information acquisition unit 40.

In Step S3, the overturn determination unit 202 determines whether the two-wheel vehicle 100 has collided with the vehicle 1, based on the peripheral information acquired by the peripheral information acquisition unit 40. In the case of the two-wheel vehicle 100 having collided with the vehicle 1 (YES), the processing advances to Step S4. In the case of the two-wheel vehicle 100 not having collided with the vehicle 1 (NO), the processing returns to Step S1.

In Step S4, the overturn determination unit 202 determines whether the two-wheel vehicle 100 has overturned based on the peripheral information acquired by the peripheral information acquisition unit 40. In the case of the two-wheel vehicle 100 having overturned (YES), the processing advances to Step S5. In the case of the two-wheel vehicle 100 not having overturned (NO), the processing returns to Step S1.

In Step S5, the additional information acquisition unit 203 acquires the additional information indicating the overturn situation of the two-wheel vehicle 100, in the case of being determined that the two-wheel vehicle 100 overturned. In Step S6, the stop request unit 206 requests stopping to the driver of the vehicle 1, in the case of being determined that the two-wheel vehicle 100 overturned in Step S4.

In Step S7, the emergency information sending unit 204 determines whether the vehicle 1 has stopped after the request by the stop request unit 206. In the case of the vehicle 1 having stopped (YES), the processing advances to Step S10. In the case of the vehicle 1 not having stopped (NO), the processing advances to Step S8.

In Step S8, the emergency information sending unit 204 sends the automatic transmittable information set in advance to the emergency call center 200 together with the emergency call information. In Step S9, the emergency call center 200 sends the emergency call information and automatic transmittable information to a police station, fire station and road service, when receiving the emergency call information from the vehicle 1.

In Step S10, the additional information determination unit 205 notifies whether the additional information may be sent to the emergency call center 200 together with the emergency call information to the driver of the vehicle 1, in the case of the vehicle 1 having stopped after the request by the stop request unit 206. For example, the additional information determination unit 205 displays characters or images by the display device 92, or notifies by voice by the voice output device 91. The additional information determination unit 205 thereby notifies whether the additional information may be sent to the emergency call center 200 together with the emergency call information to the driver of the vehicle 1.

Then, the additional information determination unit 205 determines whether or not the driver of the vehicle 1 approves of sending the additional information to the emergency call center 200 by way of an operation of the input device 93, for example. In other words, the additional information determination unit 205 determines whether to send the additional information to the emergency call center 200. In the case of being determined to send the additional information to the emergency call center 200 (YES), the processing advances to Step S11. In the case of being determined not to send the additional information to the emergency call center 200 (NO), the processing advances to Step S12.

In Step S11, the emergency information sending unit 204 sends additional information to the emergency call center 200 via the network NW together with the emergency call information.

In Step S12, the emergency information sending unit 204 sends only the emergency call information to the emergency call center 200.

In Step S13, the emergency call center 200 performs communication by way of an audio call to the vehicle 1, in order to understand the situation and perform instructions for aid, when receiving the emergency call information. In addition, the emergency call center 200 can send emergency call information and additional information to a police station, fire station and road service, and perform rescue of the two-wheel vehicle 100, when receiving the emergency call information and additional information from the vehicle 1. Furthermore, after confirming the additional information, the operator of the emergency call center 200 sends the method of the appropriate urgent aid treatment selected by the operator to the vehicle 1, and the urgent aid treatment method display unit 207 displays the method of the appropriate urgent aid treatment selected by the operator on the display device 92 visible by the driver of the vehicle 1. The possibility of lifesaving of the passenger of the overturned two-wheel vehicle 100 thereby rises, by the driver of the vehicle 1 performing the appropriate urgent agent until an ambulance arrives after conveying an image of a fallen person included in the additional information to the emergency call center 200, for example.

According to the present embodiment, the following effects are exerted, for example. The driving support device 11 according to the present embodiment includes: the peripheral information acquisition unit 40 which acquires peripheral information of the vehicle 1; the moving body detection unit 201 which detects the two-wheel vehicle 100 in the periphery of the vehicle 1 based on the peripheral information; the overturn determination unit 202 which determines whether the two-wheel vehicle 100 has overturned based on the peripheral information; the additional information acquisition unit 203 which acquires the additional information indicating the overturn situation of the two-wheel vehicle 100, in the case of being determined that the two-wheel vehicle 100 overturned; and the emergency information sending unit 204 which sends the additional information to the emergency call center 200 together with the emergency call information for performing an emergency call for the two-wheel vehicle 100.

The driving support device 11 sends the additional information indicating the overturn situation of the two-wheel vehicle 100 together with the emergency call information to the emergency call center 200, and the emergency call center 200 can thereby perform rescue of the overturned two-wheel vehicle 100, based on the emergency call information and additional information from the vehicle 1. Therefore, the driving support device 11 can reduce the injury during collision between the vehicle 1 and two-wheel vehicle 100.

In addition, the driving support device 11 further includes the additional information determination unit 205 which determines whether to send the additional information according to the overturn situation of the two-wheel vehicle 100, and the emergency information sending unit 204 sends the additional information to the emergency call center 200 together with the emergency call information, in the case of being determined to send the additional information by way of the additional information determination unit 205.

The driving support device 11 sends the additional information to the emergency call center 200 together with the emergency call information according to the overturn situation of the two-wheel vehicle 100, and can thereby request for aid of the two-wheel vehicle 100.

In addition, the driving support device 11 further includes the stop request unit 206 which requests stopping to the driver of the vehicle 1 in the case of being determined that the two-wheel vehicle 100 overturned, and the emergency information sending unit 204 sends automatic transmittable information set in advance to the emergency call center 200 together with the emergency call information, in the case of the vehicle 1 not stopping.

The driving support device 11 sends the automatic transmittable information to the emergency call center 200 together with the emergency call information, in the case of the two-wheel vehicle 100 having overturned, and can thereby request for aid of the two-wheel vehicle 100.

In addition, the emergency information sending unit 204 sends the additional information to the emergency call center 200 together with the emergency call information, in the case of the vehicle 1 having stopped after the request by the stop request unit 206. The driving support device 11 can thereby send the additional information to the emergency call center 200 together with the emergency call information, after obtaining the approval of the driver of the vehicle 1 which has stopped, for example.

In addition, the driving support device 11 further includes the urgent aid treatment method display unit 207 which displays information of urgent aid according to an instruction of the emergency call center 200, and after the operator of the emergency call center 200 confirms the additional information, the urgent aid treatment method display unit 207 displays the method of the appropriate urgent aid treatment selected by the operator to the driver of the vehicle 1. The driving support device 11 can thereby improve the probability of lifesaving of the passenger of the overturned two-wheel vehicle 100, by the driver of the vehicle 1 performing the appropriate urgent aid until an ambulance arrives, after conveying an image of the fallen person included in the additional information to the emergency call center 200, for example.

Although an embodiment of the present invention has been explained above, the above-mentioned driving support device 11 can be realized by hardware, software or a combination of these. In addition, the control method performed by the above-mentioned driving support device 11 can also be realized by hardware, software or a combination of these. Herein, realized by software indicates the matter of being realized by a computer reading out and executing a program.

The programs can be stored using a variety of types of non-transitory computer readable media, and supplied to the computer. The non-transitory computer readable media includes various types of tangible storage media. Examples of non-transitory computer readable media include magnetic media (for example, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)).

Although an embodiment of the present invention has been explained above, the present invention is not to be limited thereto. The configurations of detailed parts may be modified as appropriate within the scope of the gist of the present invention.

EXPLANATION OF REFERENCE NUMERALS 1 vehicle
2 control device
11 driving support device
40 peripheral information acquisition unit
100 two-wheel vehicle
200 emergency call center
201 moving body detection unit
202 overturn determination unit
203 additional information acquisition unit
204 emergency information sending unit
205 additional information determination unit
206 stop request unit
207 urgent aid treatment method display unit

What is claimed is:
1. A driving support device comprising:
a peripheral information acquisition unit which acquires peripheral information of a vehicle;
a moving body detection unit which detects a moving body in a periphery of the vehicle based on the peripheral information;
an overturn determination unit which determines whether the moving body overturned based on the peripheral information;
an additional information acquisition unit which acquires additional information indicating an overturn situation of the moving body, in a case of being determined that the moving body overturned;
an emergency information sending unit which sends the additional information to an external device together with emergency call information for performing an emergency call for the moving body; and
a stop request unit which requests for stopping to the driver of the vehicle, in a case of being determined that the moving body overturned,
wherein the emergency information sending unit sends automatic transmittable information which was set in advance to the external device together with the emergency call information, in a case of the vehicle not stopping.

2. The driving support device according to claim 1, further comprising an additional information determination unit which determines whether to send the additional information according to an overturn situation of the moving body, wherein the emergency information sending unit sends the additional information to the external device together with the emergency call information, in a case of being determined to send the additional information by the additional information determination unit.

3. The driving support device according to claim 1, wherein the emergency information sending unit sends the additional information to the external device together with the emergency call information, in a case of the vehicle stopping.

4. The driving support device according to claim 1, further comprising an urgent aid treatment method display unit which displays information of urgent aid according to an instruction of an emergency call center,
wherein the urgent aid treatment method display unit, after an operator of the emergency call center confirms the additional information, displays a method of appropriate urgent aid treatment selected by the operator to the driver.

* * * * *